(12) United States Patent
Tsuchida (10) Patent No.: US 12,145,229 B2
(45) Date of Patent: Nov. 19, 2024

(54) SCREW FASTENING SYSTEM AND SCREW FASTENING DEVICE (71) Applicant: ESTIC CORPORATION, Moriguchi (JP)

(72) Inventor: Yuichi Tsuchida, Moriguchi (JP)

(73) Assignee: ESTIC CORPORATION, Moriguchi (JP)

( * ) Notice: Subject to any disclaimer, the term of this patent is extended or adjusted under 35 U.S.C. 154(b) by 259 days.

(21) Appl. No.: 17/631,925

(22) PCT Filed: Apr. 8, 2020

(86) PCT No.: PCT/JP2020/015789
§ 371 (c)(1),
(2) Date: Feb. 1, 2022

(87) PCT Pub. No.: WO2021/024550
PCT Pub. Date: Feb. 11, 2021

(65) Prior Publication Data
US 2022/0347805 A1 Nov. 3, 2022

(30) Foreign Application Priority Data

Aug. 2, 2019 (JP) .................................. 2019-142934

(51) Int. Cl.
*B23P 19/06* (2006.01)
*G05B 19/18* (2006.01)
(52) U.S. Cl.
CPC ............ *B23P 19/06* (2013.01); *G05B 19/182* (2013.01); *G05B 2219/39001* (2013.01); *G05B 2219/40301* (2013.01); *G05B 2219/45203* (2013.01)
(58) Field of Classification Search
CPC ... B25J 9/06; B25J 9/0087; B25J 9/043; B25J 9/1615; B25J 15/045; B25J 19/00;
(Continued)

(56) References Cited

U.S. PATENT DOCUMENTS 6,680,595 B2    1/2004  Ito
7,422,412 B2 *  9/2008  Akaha ................. B25J 19/0025
                                                       901/29
(Continued)

FOREIGN PATENT DOCUMENTS

JP        8-11027 A       1/1996
JP    H0811027 A    *     1/1996
(Continued)

OTHER PUBLICATIONS

JP H0811027—Machine Translation (Year: 1996).*
(Continued)

*Primary Examiner* — Brian D Keller
*Assistant Examiner* — Alberto Saenz
(74) *Attorney, Agent, or Firm* — Muncy, Geissler, Olds & Lowe, P.C.

(57) ABSTRACT

A nut runner, an attachment unit, and a sliding member are provided in a second arm that is a leading arm of the robot and has a leading end shaft movable along the direction of an elevation axis. The nut runner includes a screw fastening driver, a drive shaft rotationally driven by the screw fastening driver, and an extension bar that is so connected to rotate together with the drive shaft in the circumferential direction and to move in the axial direction. The attachment unit fixedly connects the screw fastening driver to the second arm so that a screw fastening axis parallel to the elevation axis serves as a rotation axis of the screw fastening driver. The sliding member is connected to the leading end shaft and supports the extension bar so as to move together in the axial direction and are rotatable relatively in the circumferential direction.

13 Claims, 11 Drawing Sheets

(58) Field of Classification Search
CPC ....... B23P 19/06; B23P 19/061; B23P 19/001; B23P 19/00; B23P 19/04; G05B 19/06; G05B 19/182; G05B 19/39001; G05B 2219/40301; G05B 2219/45203
USPC .......... 81/57.4, 57.37, 54, 433; 29/240, 790, 29/407.02, 525.11; 470/3, 49
See application file for complete search history.

(56) References Cited

U.S. PATENT DOCUMENTS

| | | |
|---|---|---|
| 2017/0036345 A1 | 2/2017 | Bordegnoni et al. |
| 2018/0021900 A1 | 1/2018 | Huang et al. |

FOREIGN PATENT DOCUMENTS

| | | |
|---|---|---|
| JP | 2002-1676 A | 1/2002 |
| JP | 2003136464 A * | 5/2003 |
| JP | 2011-73137 A | 4/2011 |
| JP | 2017-30140 A | 2/2017 |
| JP | 2018-134701 A | 8/2018 |

OTHER PUBLICATIONS

JP 2003136464—Machine Translation (Year: 2003).*
NPL Article: Flexibowl "SCARA Robot" Date: Feb. 12, 2015 URL:https://web.archive.org/web/20150212185357/https://www.flexibowl.com/scara-robot.html (Year: 2015).*
International search report dated Jun. 23, 2020 for corresponding PCT patent application No. PCT/JP2020/015789 and its English translation.
International Preliminary Report dated Jul. 21, 2021 for corresponding PCT patent application No. PCT/JP2020/015789 and its partial English translation.

* cited by examiner

SCREW FASTENING SYSTEM AND SCREW FASTENING DEVICE

FIELD

The present invention relates to a technology for using a screw fastening device in combination with a robot such as a SCARA robot.

BACKGROUND

Screw fastening devices have conventionally been used for screwing workpieces in factory production lines. Examples of such a screw fastening device include an impact type screw fastening device that intermittently applies tightening torque to a screw (Patent Literature 1) and a continuous or direct type screw fastening device that continuously applies tightening torque.

Further, for labor-saving in production lines, industrial robots such as SCARA robots are often used.

Such a SCARA robot is provided with a first arm rotatably supported at a base and a second arm rotatably supported by the first arm, and the second arm has an axis of motion that can rotate and move up and down as an output shaft (Patent Literature 2). Another technology has been proposed in which a second arm is further provided with a third arm and an operating unit such as a gripper member is provided on an operation axis that rotates and translates in the third arm (Patent Literature 3).

For screw fastening using a SCARA robot, a screw fastening system in which a screw fastening device is attached to the SCARA robot is used.

Figure 11:
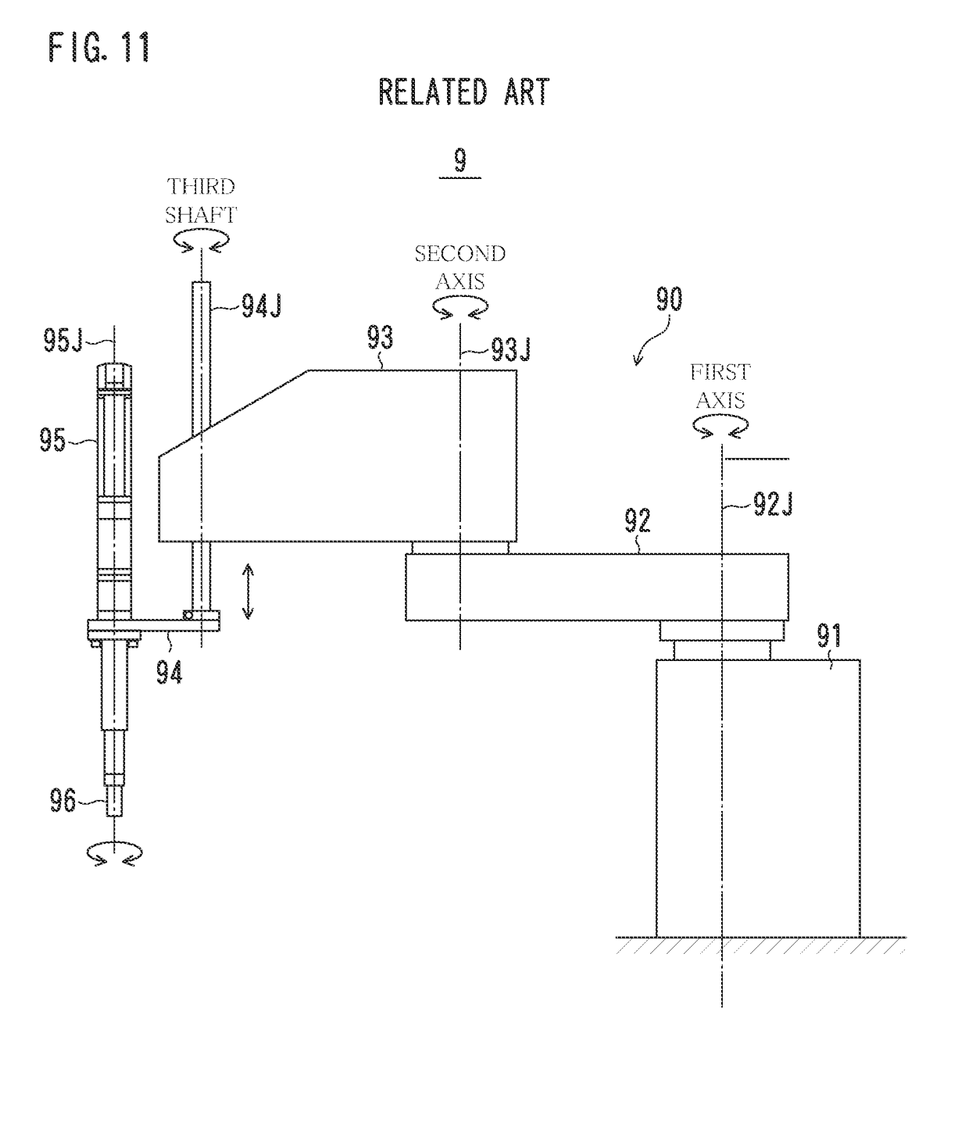
FIG. 11 is a diagram showing an example of a conventional screw fastening system.

FIG. 11 is a diagram showing an example of a conventional screw fastening system 9.

Referring to FIG. 11, a SCARA robot 90 has a base 91, a first arm 92, and a second arm 93, and further, a third arm 94 is attached, and a screw fastening device 95 is attached to a leading end of the third arm 94. The first arm 92, the second arm 93, and the third arm 94 are rotationally driven with a first axis 92J, a second axis 93J, and a third shaft 94J as the rotation axes, respectively. The third shaft 94J serves to perform elevation drive as well as the rotation drive, which moves up and down the third arm 94. The screw fastening device 95 has, at its lower part, a tool 96 that rotates around a fourth axis 95J.

In the screw fastening system 9, the arms 92, 93, and 94 are rotationally driven to position the tool 96 on an XY-plane and the third arm 94 moves up and down to position the tool 96 in the height direction (Z-direction), and the screw fastening device 95 drives the rotation of the tool 96 to fasten a screw.

CITATION LIST

Patent Literature

Patent Literature 1: Japanese Patent Application Laid-Open No. 2011-073137
Patent Literature 2: Japanese Patent Application Laid-Open No. 2018-134701
Patent Literature 3: Japanese Patent Application Laid-Open No. 2017-030140

SUMMARY

Technical Problem

The screw fastening system 9 shown in FIG. 11 can be implemented, for example, by attaching the third arm 94 and the screw fastening device 95 to the third shaft 94J of a general SCARA robot having the two arms 92 and 93.

However, in the conventional screw fastening system 9, the screw fastening device 95 is supported by the third arm 94; therefore, a reaction force of tightening torque by the screw fastening device 95 is transmitted through the third arm 94 to the third shaft 94J, which produces torque (reaction force) to rotate the third shaft 94J.

Thus, the maximum value of the tightening torque produced by the screw fastening device 95 is limited due to the stiffness of an elevation shaft constituting the third shaft 94J and acceptable torque of a motor that rotationally drives the elevation shaft, and thus, the tightening torque by the screw fastening device 95 cannot be increased beyond the limit. As a result, the tightening capacity of the screw fastening device 95 cannot be fully utilized.

In order to increase the tightening torque, it is necessary to increase the stiffness of the elevation shaft constituting the third shaft 94J and use a larger motor with a large holding force to produce holding torque to withstand the reaction force, or to use a large motor having a brake with a large holding force.

Since the reaction force of the tightening torque is also transmitted to the second arm 93 and the first arm 92, it is necessary to increase the holding torque also in the second axis 93J and the first axis 92J.

For example, in a SCARA robot described in Patent Literature 2, a third arm is attached to an axis of motion L4 that is an output shaft of a second arm; therefore, it is necessary to increase the stiffness of a ball spline in the axis of motion L4 and to use a motor with large holding torque.

Thus, the SCARA robot used in the conventional screw fastening system 9 tends to be larger. In other words, even in a case where a small SCARA robot sufficiently meets conditions for allowable weight capacity or range of movement, a large SCARA robot has to be used in some cases in order to withstand the reaction force of the tightening torque by the screw fastening device 95.

This increases the size of the SCARA robot 90, which causes an increase in installation area and installation cost. Further, increasing the size of the SCARA robot 90 may increase time to transfer the screw fastening device 95 or a workpiece, which sometimes reduces production efficiency.

The present invention has been achieved in light of such a problem, and therefore, an object of the present invention is to enable a screw fastening device to be used easily in combination with a robot such as a SCARA robot without increasing the size of the robot.

Solution to Problem

According to an aspect of the present invention, a screw fastening system includes a SCARA robot having a first arm at a base and a second arm on a leading end side that is connected in series to the first arm, a leading end shaft that is provided in the second arm and is driven to move along an elevation axis that is an output shaft of the second arm by a driving means of the second arm, and a screw fastening device that is fixedly provided in a casing of the second arm in a screw fastening axis that is different from the elevation axis and parallel to the elevation axis, wherein the screw fastening device includes a screw fastening driving means fixedly provided in the casing of the second arm, a drive shaft rotationally driven by the screw fastening driving means, an extension bar that is so connected to rotate together with the drive shaft in a circumferential direction of the screw fastening axis and to move in an axial direction of the screw fastening axis, and is provided with a tool at a tip of the extension bar, and a sliding member that is fixedly connected to the leading end shaft and supports the extension bar so as to move together in the axial direction and be rotatable relatively in the circumferential direction, and movement drive of the leading end shaft causes movement drive of the extension bar in the screw fastening axis, and a screw of a workpiece fitted into the tool is rotated by rotation drive of the screw fastening driving means.

A screw fastening device according to an aspect of the present invention is a screw fastening device fixedly attached to a casing of a second arm of a SCARA robot, the SCARA robot having a first arm at a base and a second arm on a leading end side that is connected in series to the first arm and has a leading end shaft, and the leading end shaft being driven to move along an elevation axis that is an output shaft of the second arm by a driving means of the second arm. The screw fastening device includes a screw fastening driving means fixedly provided in the casing of the second arm, a connecting member that fixedly connects the screw fastening driving means to the leading arm so that a screw fastening axis parallel to the elevation axis serves as a rotation axis of the screw fastening driving means, a drive shaft rotationally driven by the screw fastening driving means, an extension bar that is so connected to rotate together with the drive shaft in a circumferential direction of the screw fastening axis and to move in an axial direction of the screw fastening axis, and is provided with a tool at a tip of the extension bar, and a sliding member that is fixedly connected to the leading end shaft and supports the extension bar so as to move together in the axial direction and be rotatable relatively in the circumferential direction, wherein movement drive of the leading end shaft causes movement drive of the extension bar in the screw fastening axis, and a screw of a workpiece fitted to the tool is rotated by rotation drive of the screw fastening driving means.

Advantageous Effects of Invention

The present invention enables a screw fastening device to be used easily in combination with a robot such as a SCARA robot without increasing the size of the robot.

DESCRIPTION OF EMBODIMENTS

Figure 1:
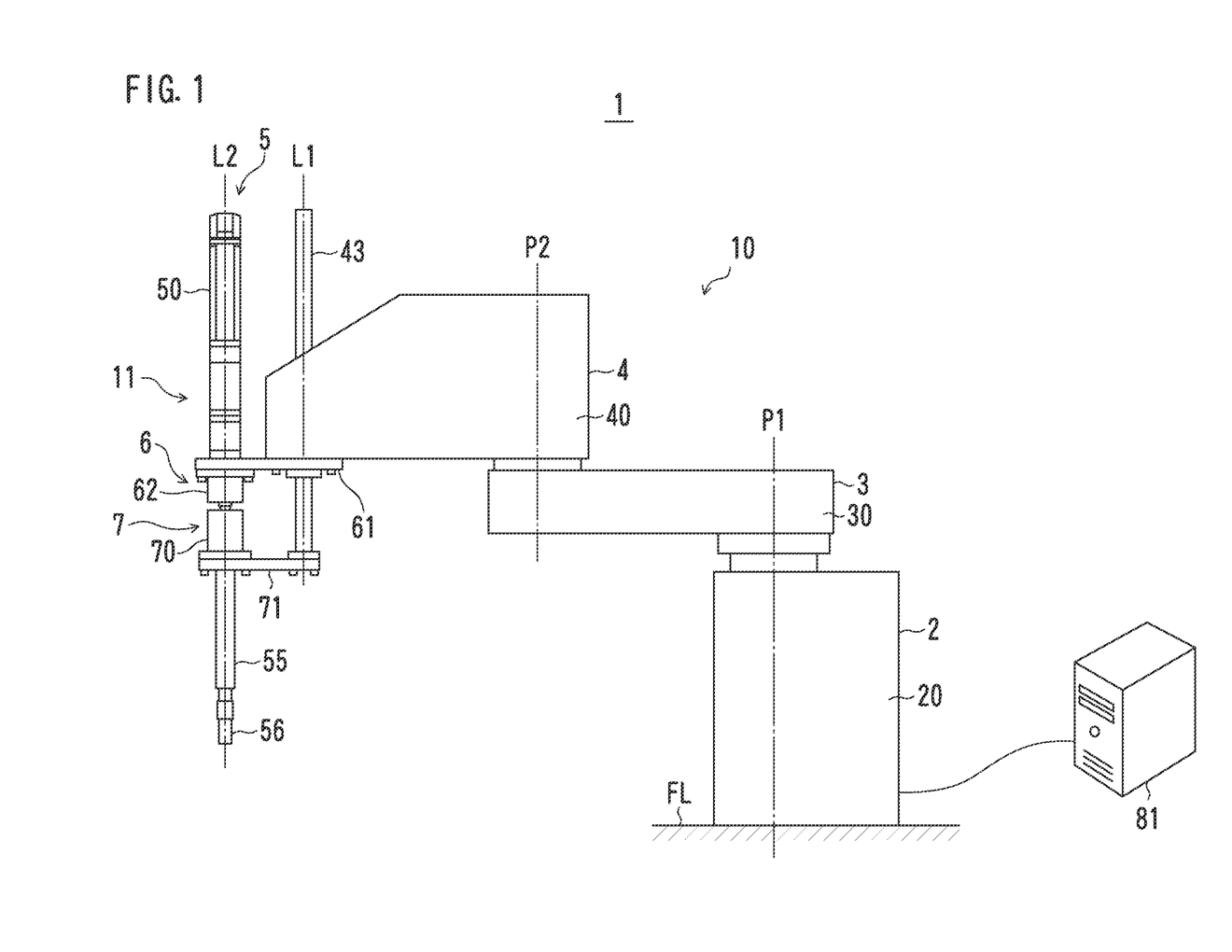
FIG. 1 is a front view showing an example of the overall configuration of a screw fastening system.
Figure 2:
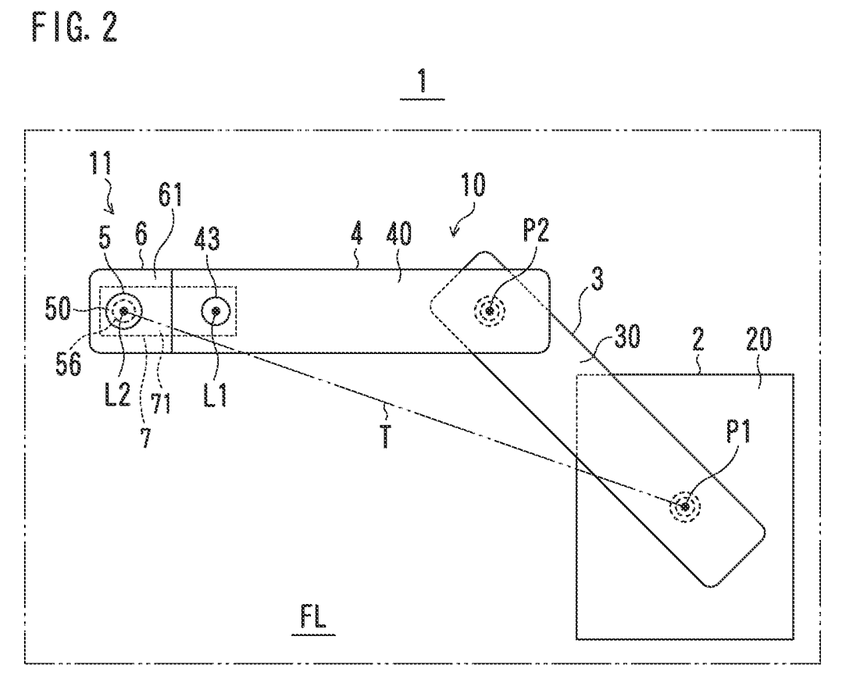
FIG. 2 is a plan view showing an example of a state of a screw fastening system.
Figure 3:
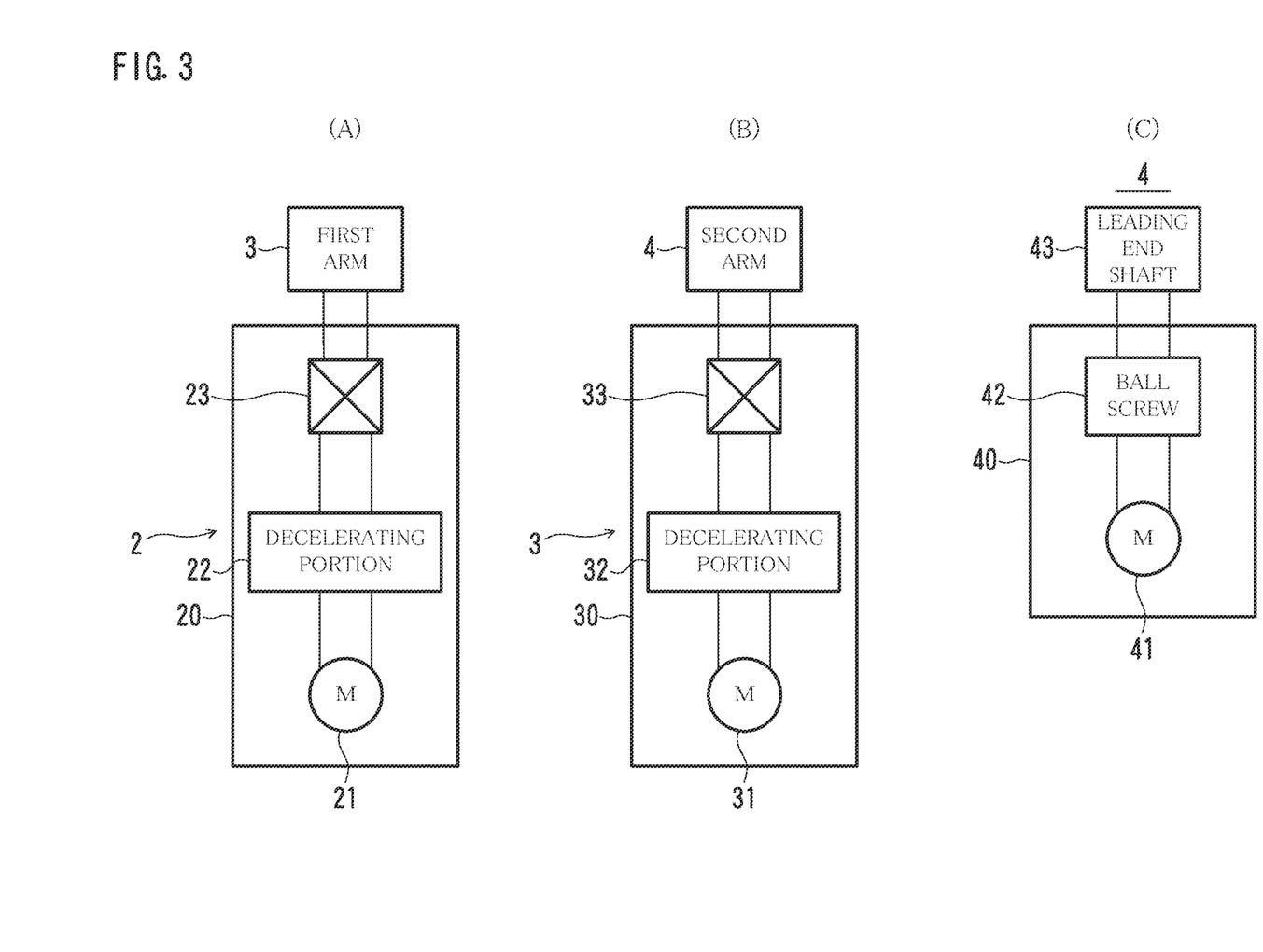
FIG. 3 is a diagram showing an example of a drive system of each of a base, a first arm, and a second arm.
Figure 4:
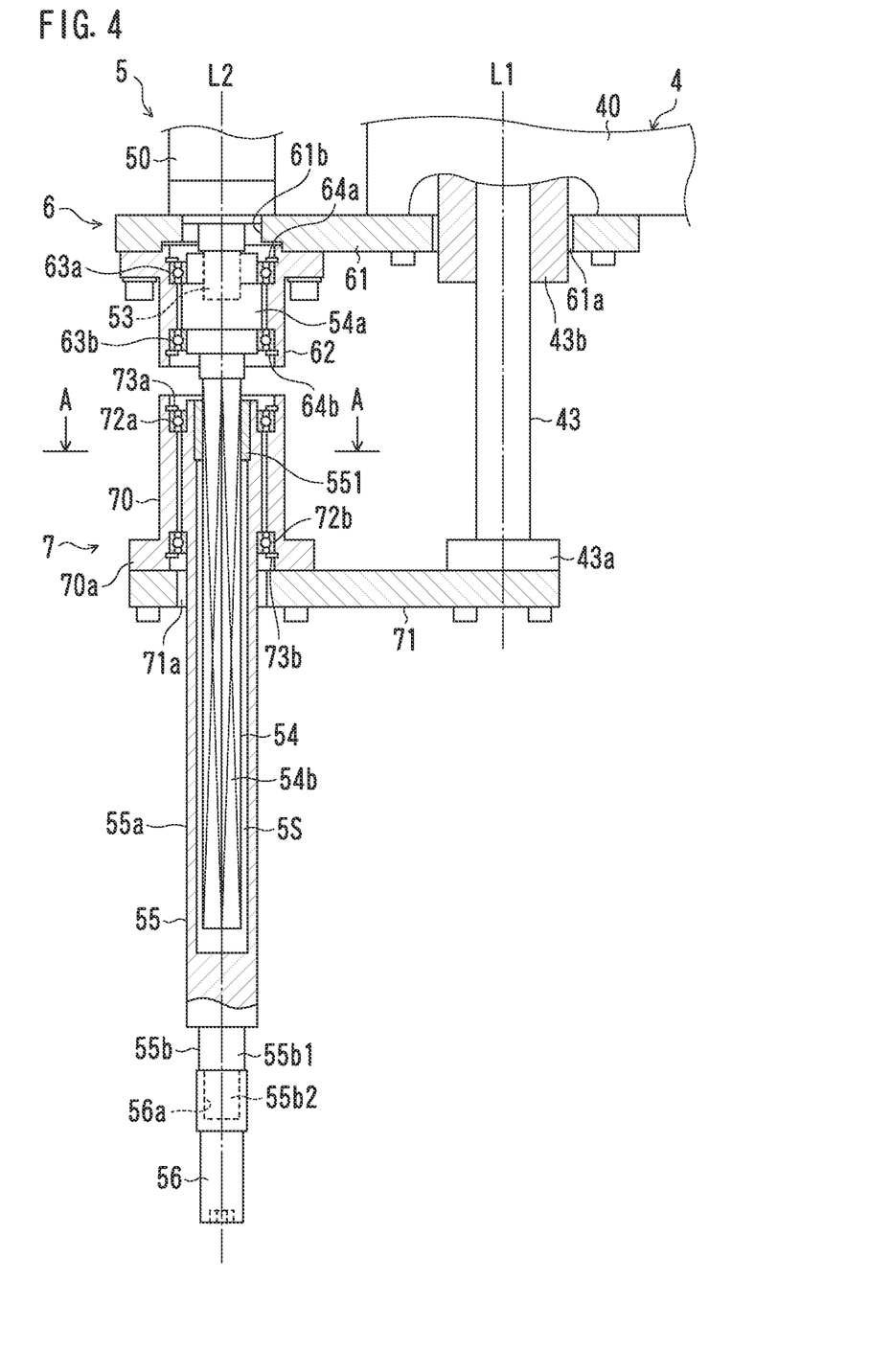
FIG. 4 is a diagram showing an example of the configuration of a screw fastening device, an attachment unit, and a telescopic support unit.
Figure 5:
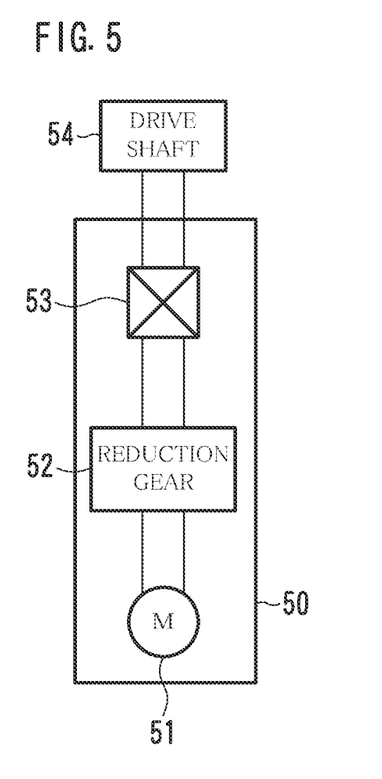
FIG. 5 is a diagram showing an example of the configuration of a drive.
Figure 6:
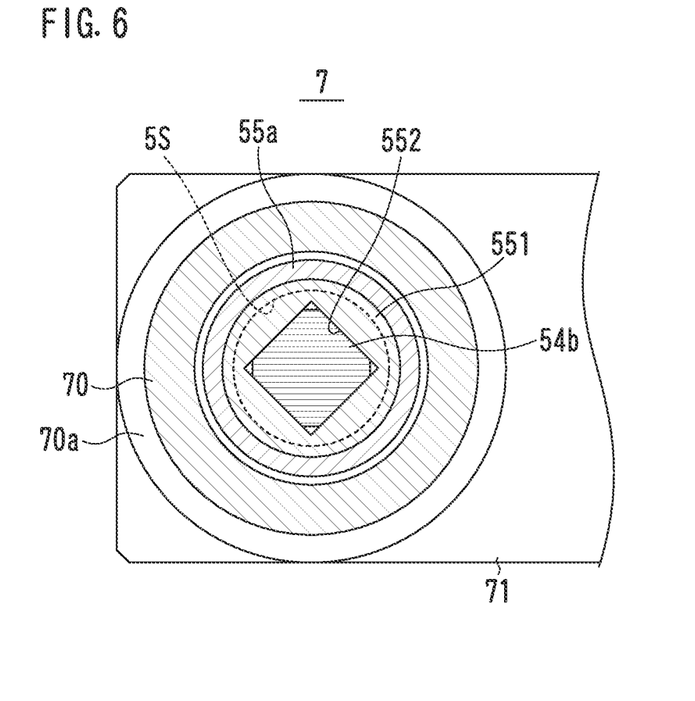
FIG. 6 is a cross-sectional view taken along the line A-A of FIG. 4.
Figure 7:
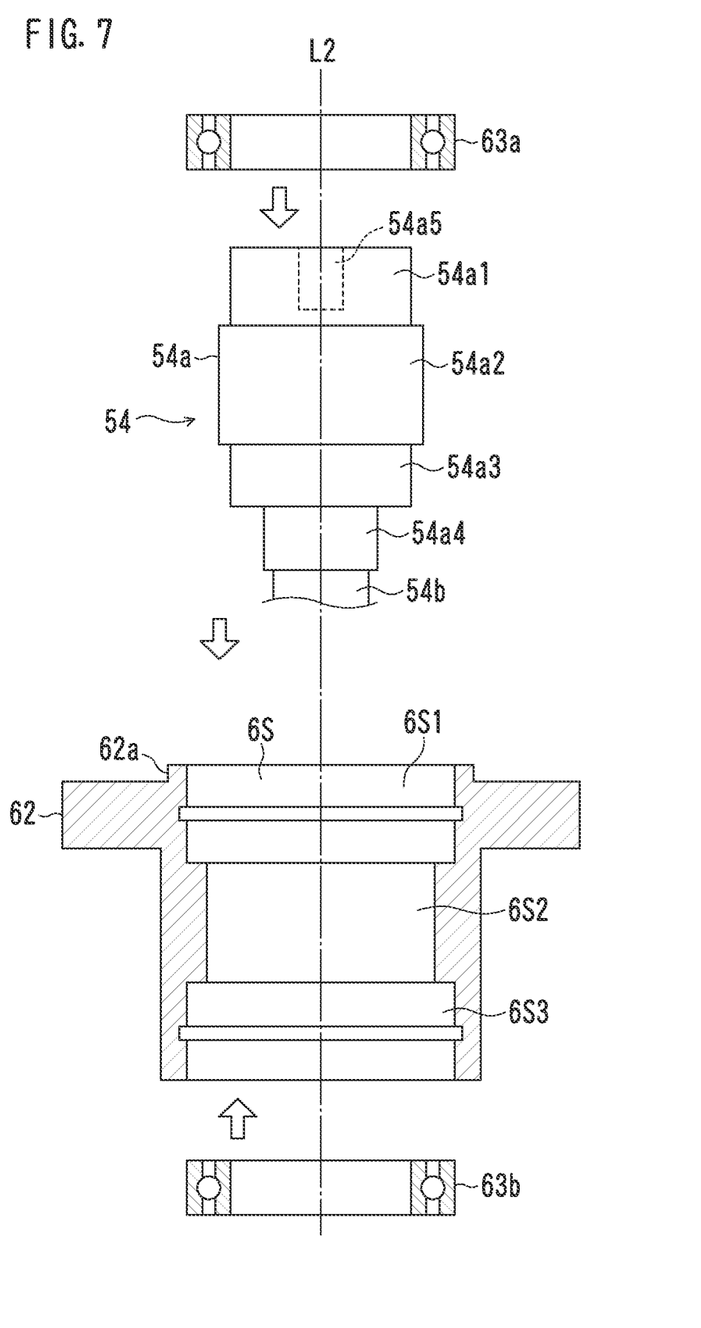
FIG. 7 is a diagram for explanation of an example of each constituent element of a drive shaft and a bearing box.
Figure 8:
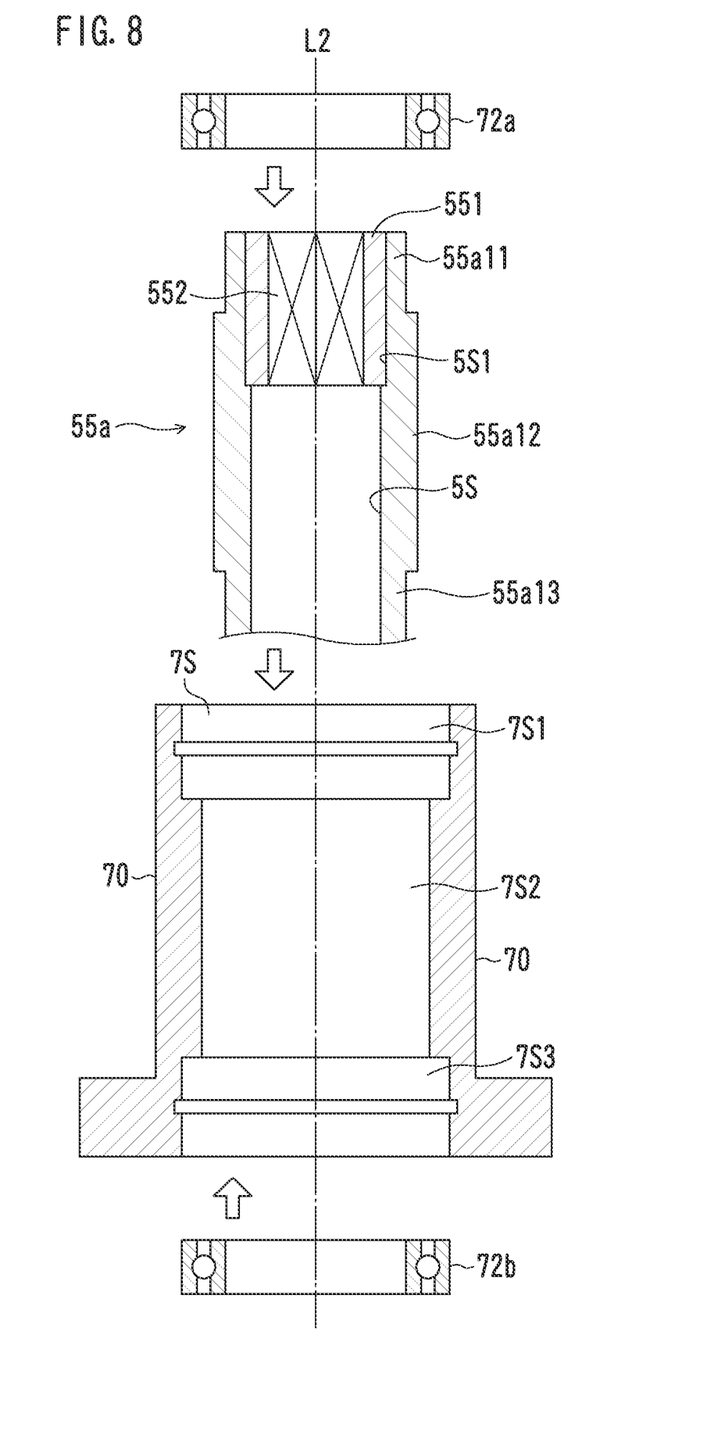
FIG. 8 is a diagram for explanation of an example of each constituent element of a cylindrical part and a housing case.

FIG. 1 is a front view showing an example of the overall configuration of a screw fastening system 1; FIG. 2 is a plan view showing an example of a state of the screw fastening system 1; FIG. 3 is a diagram showing an example of a drive system of each of a base 2, a first arm 3, and a second arm 4; FIG. 4 is a diagram showing an example of the configuration of a screw fastening device body 5, an attachment unit 6, and a sliding member 7; FIG. 5 is a diagram showing an example of the configuration of a drive 50; FIG. 6 is a cross-sectional view taken along the line A-A of FIG. 4; FIG. 7 is a diagram for explanation of an example of each constituent element of a drive shaft 54 and a bearing box; and FIG. 8 is a diagram for explanation of an example of each constituent element of a cylindrical part 55a and a housing case 70.

The screw fastening system 1 shown in FIG. 1 includes a SCARA robot 10 and a screw fastening device 11. In other words, the screw fastening system 1 is an industrial robot in which the screw fastening device 11 is combined with the SCARA robot 10.

The SCARA robot 10 moves the screw fastening device 11 to any position in a predetermined space, which allows the screw fastening device 11 to tighten a screw on a workpiece therebelow. Note that, in this specification, screw tightening also includes loosening a screw.

The SCARA robot 10 is a robot generally called a "SCARA type robot" or a "horizontal multi-joint robot", and the SCARA robot 10 includes the base 2, the first arm 3, and the second arm 4. The first arm 3 and the second arm 4 rotate around a first axis P1 and a second axis P2 respectively, in the normal direction or in the reverse direction. The first axis P1, the second axis P2, an elevation axis L1, and a screw fastening axis L2 are parallel to one another. In this embodiment, the following describes an example in which all of the four axes are along the vertical direction.

As shown in FIGS. 1 to 3, the base 2 supports the first arm 3 to rotate the first arm 3 under the control of a control device 81. As shown in FIG. 3(A), the base 2 includes a base casing 20, a motor 21, a decelerating portion 22, and an output shaft 23.

The base casing 20 is made of iron, aluminum alloy or other light alloy, reinforced plastic, or the like. The same applies to arm casings 30 and 40 described later. The screw fastening system 1 is used with the base casing 20 fixed to a floor FL, a horizontal plane FL of a body of another machine, or the like.

Referring to FIG. 3, the motor 21 is a rotational drive source that rotationally drives the output shaft 23 through the decelerating portion 22 under the control of the control device 81. Examples of the motor 21 include a DC brushless motor, a stepping motor, and an AC servo motor. The same applies to motors 31, 41, and 51 described later.

The decelerating portion 22 decelerates the rotation of the motor 21 to transmit the turning force to the output shaft 23. Examples of the decelerating portion 22 include various gear devices and a transmission device. The same applies to a decelerating portion 32 described later.

The output shaft 23 is connected to the first arm 3. The first arm 3 rotates around the first axis P1 in conjunction with the rotation of the output shaft 23.

The first arm 3 supports the second arm 4 to rotate the second arm 4 under the control of the control device 81. As shown in FIG. 3(B), the first arm 3 includes the arm casing 30, the motor 31, the decelerating portion 32, and an output shaft 33.

The motor 31 rotationally drives the output shaft 33 through the decelerating portion 32 under the control of the control device 81. The decelerating portion 32 decelerates the rotation of the motor 31 to transmit the turning force to the output shaft 33.

The output shaft 33 is connected to the second arm 4. The second arm 4 rotates around the second axis P2 in conjunction with the rotation of the output shaft 33.

The screw fastening device 11 is attached to the second arm 4. As shown in FIG. 3(C), the second arm 4 includes the arm casing 40, the motor 41, a ball screw 42, and a leading end shaft 43.

The motor 41 is a rotational drive source that rotates under the control of the control device 81 to rotate a screw shaft of the ball screw 42 or a ball nut. The ball screw 42 converts the rotational motion from the motor 41 into linear motion.

The leading end shaft 43 is a rod provided so as to pass through the arm casing 40, is connected to the ball screw 42, and moves up and down along the elevation axis L1 together with the linear motion of the ball screw 42. The elevation axis L1 is an axis that should be called a third axis (P3) of the SCARA robot 10.

The rotation of the motor 41 moves the leading end shaft 43 up and down (in the axial direction). The leading end shaft 43 moves up and down at a speed according to the rotational speed of the motor 41, and is positioned at a position (height position) according to the amount of rotation of the motor 41. In positioning of the leading end shaft 43 at the height position, keeping at the height position depends on the holding force at the stop of the motor 41 or on the holding force of a brake device provided separately.

Note that, in the SCARA robot 10, the second arm 4 has a mechanism for rotating the leading end shaft 43 with the elevation axis L1 as the rotation axis in some cases, as in the SCARA robot described in Patent Literature 2, for example. However, in this embodiment, the function to rotate the leading end shaft 43 is not used.

Thus, a drive motor for rotating the leading end shaft 43 and a transmission mechanism are not required and may be omitted or removed if the drive motor and the transmission mechanism are already provided. Alternatively, the function to rotate the leading end shaft 43 may be disabled.

Since the mechanism to rotate the leading end shaft 43 is unnecessary, the weight is reduced, the weight of the leading end of the SCARA robot 10 is reduced to reduce the moment of inertia, the positioning speed by the SCARA robot 10 is increased, which shortens the cycle time and enhances the production efficiency.

Next, the screw fastening device 11 includes the screw fastening device body 5, the attachment unit 6, and the sliding member 7.

The screw fastening device body 5 tightens a screw such as a nut or a bolt. A device mainly used to automatically tighten a screw may be generally called a "nut runner" or an "automatic fastener". Examples of the screw fastening device body 5 include an impact type screw fastening device and a continuous type screw fastening device. In this embodiment, the following describes an example of using an impact type screw fastening device such as the one described in Japanese Patent Application Laid-Open No. 2002-001676 or Japanese Patent Application Laid-Open No. 2011-073137. Thus, as for the detailed configurations and functions, the publications can be referred to.

As shown in FIG. 4, the screw fastening device body 5 includes the drive 50, the drive shaft 54, an extension bar 55, and a tool 56.

As shown in FIG. 5, the drive 50 includes the motor 51, a reduction gear 52, and an output shaft 53.

The motor 51 is a rotational drive source that rotationally drives the output shaft 53 through the reduction gear 52 under the control of the control device 81. The reduction gear 52 decelerates the rotation of the motor 51 to transmit the turning force to the output shaft 53. In a case where a planetary gear device is used as the reduction gear 52, the planetary gear device can also operate as an impact generator. The output shaft 53 has a square cross-sectional shape at the tip, and the drive shaft 54 is rotationally driven by engagement with the tip.

Returning back to FIG. 4, the drive shaft 54 has a connector part 54a, which is a base, and a shaft bar 54b extending to be connected to the connector part 54a. The connector part 54a and the shaft bar 54b are integrally formed with each other by machining or the like.

As shown in FIG. 7, the connector part 54a has four parts of a head 54a1, a chest 54a2, a waist 54a3, and a leg 54a4, which are integrally formed with one another. Each of the head 54a1, the chest 54a2, the waist 54a3, and the leg 54a4 has a cylindrical shape; however, the cross-sectional diameters thereof are different from one another.

Further, the connector part 54a has, on its upper end face, a recess 54a5 into which the tip of the output shaft 53 is fitted, and the engagement between the tip of the output shaft 53 and the recess 54a5 allows the drive shaft 54 to be rotationally driven integrally by the output shaft 53.

Referring also to FIGS. 6 and 8, the shaft bar 54b is a rod that extends downwardly from a lower end face of the connector part 54a and has a square cross-sectional shape. The corner parts of the shaft bar 54b are chamfered at 45 degrees or rounded.

Referring back to FIG. 4, the extension bar 55 is a member that extends downwardly the output shaft of the screw fastening device body 5 along the screw fastening axis L2 and moves telescopically. The extension bar 55 has the cylindrical part 55a and a connecting part 55b.

Referring also to FIGS. 6 and 8, the cylindrical part 55a has three parts of an upper part 55a11, a middle part 55a12, and a lower part 55a13. The outline of each of the upper part 55a11, the middle part 55a12, and the lower part 55a13 is a circumferential surface, and outer diameters (diameters) thereof are different from one another.

The cylindrical part 55a has a cylindrical hole 5S of which an inner diameter is larger than the maximum outer diameter of the shaft bar 54b, which enables the shaft bar 54b to be inserted into the cylindrical hole 5S.

Further, a hole 5S1 having a diameter larger than that of the hole 5S is provided at an upper opening of the hole 5S, and a bearing bush 551 having a circumferential outline is fitted into the hole 5S1. A member having good slidability is used for the bearing bush 551, and a hole 552 having an inner surface of a square cross-sectional shape is provided at the center of the bearing bush 551, which allows the shaft bar 54b to pass through the hole 552 and slide.

The outer surface of the bearing bush 551 is fitted into the hole 5S1 of the cylindrical part 55a by tightening and fitting, and a key, screw, welding, and adhesive is used as a detent.

As the means for forming a hole with a square cross-section on the cylindrical part 55a, another means may be used; for example, a member having a hole with a square cross-section may be connected to the top end face of the cylindrical part 55a by welding and so on.

The cross-sectional shape of the shaft bar 54b and the hole 552 may be a rectangular shape, a hexagonal shape, an elliptical shape, a spline shape, or the like, in addition to the square shape. Further, the shaft bar 54b and the hole 552 may be cylindrical in cross section and the turning force may be transmitted by the key and the key groove. The cross-sectional shape may be any shape as long as the running torque can be transmitted and a stroke motion (movement in the axial direction) can be made; therefore, the cross-sectional shape may be designed according to the actual conditions of use.

The shaft bar 54b is inserted into the hole 5S of the cylindrical part 55a of the extension bar 55. Since the outer surface of the shaft bar 54b engages with the inner surface of the hole 552 of the bearing bush 551 in the direction of the rotation, the drive shaft 54 and the extension bar 55 are so connected to rotate together in the circumferential direction and to move in the axial direction.

Stated differently, when the drive shaft 54 rotates in the state shown in FIG. 4, the extension bar 55 rotates simultaneously. When the extension bar 55 moves in the axial direction, the position in the axial direction at which the shaft bar 54b and the bearing bush 551 engage with each other is changed; however, the rotation of the drive shaft 54 is transmitted to the extension bar 55, and the drive shaft 54 and the extension bar 55 rotate together as long as the shaft bar 54b and the bearing bush 551 engage with each other.

In a case where the shaft bar 54b is inserted into the hole 5S of the cylindrical part 55a, the shaft bar 54b contacts neither the inner surface of the hole 5S nor the bottom thereof.

The connecting part 55b is integrally formed with a lower end part of the cylindrical part 55a. The connecting part 55b is provided with a tip 55b2 having the same shape as the tip of the output shaft 53. Stated differently, the tip 55b2 has a square cross-sectional shape, a recess 56a of the tool 56 is fitted thereinto, and the tool 56 is rotationally driven together by the extension bar 55.

Examples of the tool 56 include a socket, a bit, and other tool. Although being not shown, a mechanism for preventing the tool 56 from falling off from the connecting part 55b is provided in the tool 56 and the connecting part 55b.

Referring back to FIG. 4, the attachment unit 6 includes a connecting member 61, a bearing box 62, and two ball bearings 63a and 63b, and the attachment unit 6 connects the screw fastening device body 5 to the arm casing 40 of the second arm 4 to fix them integrally.

The connecting member 61 is bolted to a lower surface of the arm casing 40. The connecting member 61 has cylindrical through-hole 61a and through-hole 61b that run through with the elevation axis L1 and the screw fastening axis L2 as the center position, respectively.

The through-hole 61a of the connecting member 61 is large enough so that the connecting member 61 does not interfere with the leading end shaft 43 and a guide member 43b of the second arm 4. As the through-hole 61b, a through-hole having a small diameter into which a positioning flange provided in the end face of the drive 50 is fitted and a through-hole having a large diameter into which a positioning flange 62a (see FIG. 7) provided in the bearing box 62 are formed continuously. This aligns the drive 50 with the bearing box 62, the drive shaft 54, and the like.

The bearing box 62 is bolted to a lower surface of the connecting member 61. Further, as shown in FIG. 7, the bearing box 62 has a hole 6S that runs through along the screw fastening axis L2, and the connector part 54a of the drive shaft 54 of the screw fastening device body 5 passes through the hole 6S.

The hole 6S of the bearing box 62 includes a first hole 6S1, a second hole 6S2, and a third hole 6S3. The first hole 6S1, the second hole 6S2, and the third hole 6S3 are cylindrical concentric holes centered on the screw fastening axis L2. The second hole 6S2 is larger than an outer diameter of the connector part 54a of the drive shaft 54, and they do not interfere with each other.

For example, before the bearing box 62 is attached to the connecting member 61, the ball bearing 63a is fitted between the first hole 6S1 and the head 54a1 with the connector part 54a of the drive shaft 54 inserted into the hole 6S, and the ball bearing 63b is fitted between the third hole 6S3 and the waist 54a3. The ball bearings 63a and 63b are prevented from coming off with retaining rings 64a and 64b (see FIG. 4), respectively. This allows the drive shaft 54 to be rotatably supported by the bearing box 62.

Referring back to FIG. 4, the sliding member 7 includes the housing case 70, a connecting plate 71, and two ball bearings 72a and 72b.

As shown in FIG. 8, the housing case 70 has a hole 7S that runs through along the screw fastening axis L2, and the shaft bar 54b of the drive shaft 54 of the screw fastening device body 5 passes through the hole 7S.

The hole 7S of the housing case 70 includes a first hole 7S1, a second hole 7S2, and a third hole 7S3. The first hole 7S1, the second hole 7S2, and the third hole 7S3 are cylindrical concentric holes centered on the screw fastening axis L2. The second hole 7S2 is larger than an outer diameter of the middle part 55a12 of the extension bar 55, and they do not interfere with each other.

For example, before the housing case 70 is attached to the connecting plate 71, the ball bearing 72a is fitted between the first hole 7S1 and the upper part 55a11 with the cylindrical part 55a of the extension bar 55 inserted into the hole 7S, and the ball bearing 72b is fitted between the third hole 7S3 and the lower part 55a13. The ball bearings 72a and 72b are prevented from coming off with retaining rings 73a and 73b (see FIG. 4), respectively. This allows the extension bar 55 to be rotatably supported by the housing case 70.

Thus, when the extension bar 55 is rotated, the running torque thereof is not transmitted to the housing case 70.

Referring back to FIG. 4, the connecting plate 71 is a rectangular plate member for connecting the leading end shaft 43 and the housing case 70 to each other, and the connecting plate 71 has a cylindrical through-hole 71a for the extension bar 55 to pass through without interference.

The housing case 70 has a flange part 70a that is bolted to one end of the connecting plate 71, and the other end of the connecting plate 71 is bolted to a flange part 43a of the leading end shaft 43. In such a case, the connecting plate 71 is attached in such a manner that the central axes of the drive shaft 54 and the extension bar 55 coincide with the screw fastening axis L2 and further the extension bar 55 smoothly moves up and down along the screw fastening axis L2.

Note that the shape of the flange part 43a and the flange part 70a in a plan view may be a circular or rectangular shape. Further, the shape of the end of the connecting plate 71 may be made to follow the shape of the flange part 43a and the flange part 70a.

As a method for connecting the connecting plate 71 and the leading end shaft 43 to each other, a bearing, a bush, or the like may be used to connect the connecting plate 71 and the leading end shaft 43 so as to rotate relatively and move together in the axial direction. For example, the connecting plate 71 and the leading end shaft 43 may be connected by using a structure similar to the connection structure of the connector part 54a of the drive shaft 54 and the bearing box 62. In such a case, a relative degree of flexibility between the connecting plate 71 and the leading end shaft 43 increases, the alignment and the position adjustment are facilitated, and only axial load is applied to the leading end shaft 43, which increases the degree of flexibility in design, processing, and assembly.

The control device 81 shown in FIG. 1 controls the SCARA robot 10 and the screw fastening device 11 to control the entirety of the screw fastening system. The control device 81 includes, for example, control circuits for the motors 21, 31, 41, and 51, a circuit for processing signals sent from various sensors, an operation control circuit, a teaching circuit, another signal processing circuit, an arithmetic processing circuit, and a computer for control and display.

The description goes on to operation of the screw fastening system 1.

Figure 9:
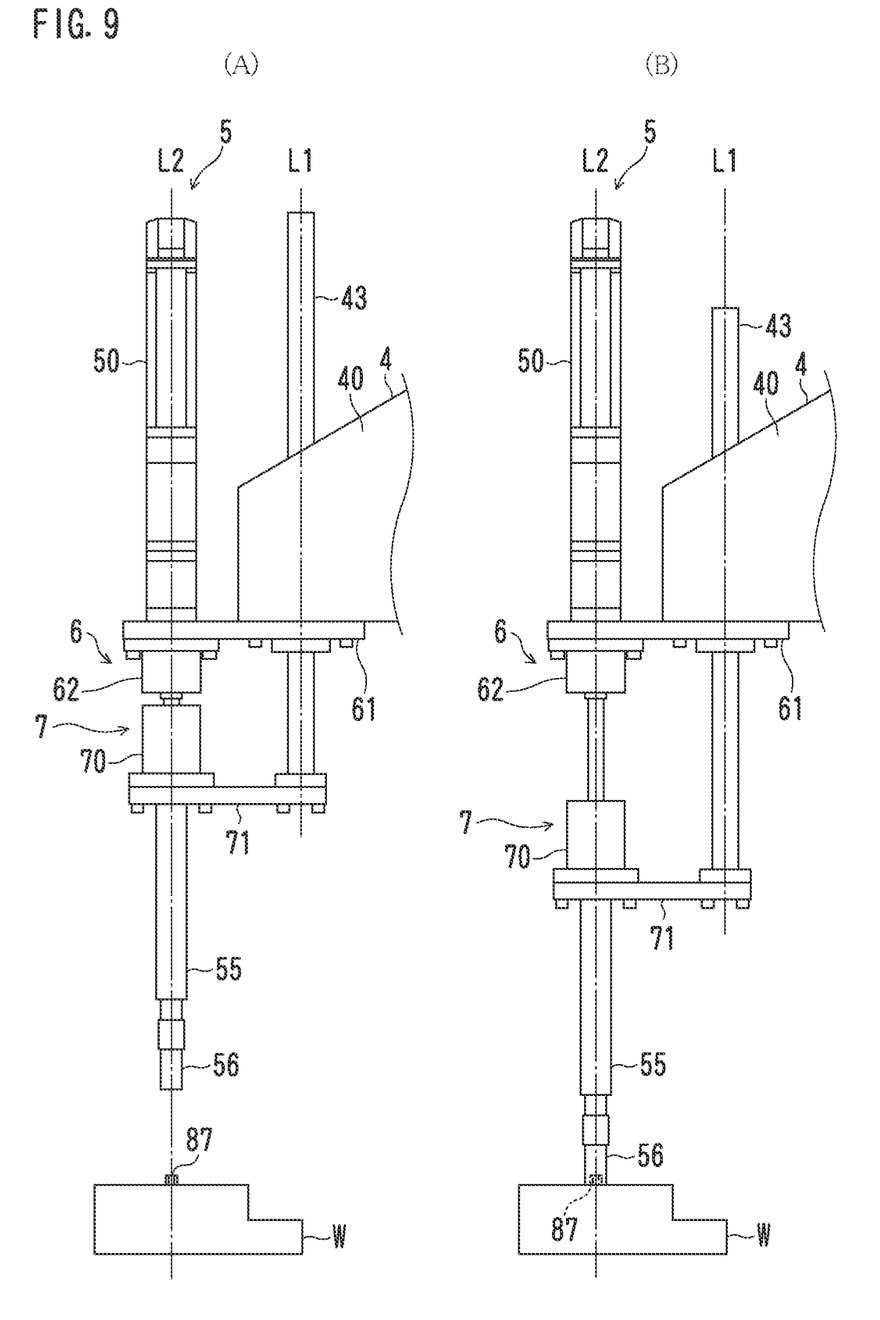
FIG. 9 is a diagram showing an example of elevation operation of a screw fastening device.

FIG. 9 is a diagram showing an example of elevation operation of the screw fastening device body 5.

As shown in FIG. 9(A), the first arm 3 and the second arm 4 rotate and move in the horizontal direction, so that the screw fastening device body 5 is positioned directly above a nut 87 of a workpiece W. In this state, the center of the nut 87 and the screw fastening axis L2 coincide with each other.

As the leading end shaft 43 moves downward from the state shown in FIG. 9(A), the sliding member 7, the extension bar 55, and the tool 56 move downward, and the tool 56 is fitted to the nut 87 as shown in FIG. 9(B). After that, the screw fastening device body 5 tightens the nut 87.

The reaction force due to the screw tightening is applied to the drive 50. Since the drive 50 is integrated with the arm casing 40 through the connecting member 61 to form a single stiff body, the reaction force applied to the drive 50 is received by the stiffness of the entire second arm 4.

In the meantime, as shown in FIG. 2, the second arm 4 is connected to the first arm 3 on the second axis P2, and the first arm 3 is fixed to the base 2, namely, on the floor FL, on the first axis P1; therefore, the second arm 4, the first arm 3, and a link line T connecting the first axis P1 on the floor FL and the screw fastening axis L2 form a triangle.

Thus, the reaction force due to the screw tightening acts on the second arm 4, which produces torque for rotating the second arm 4; however, it is theoretically impossible for the torque to generate a force to rotate the second axis P2 itself. This is because the second arm 4, the first arm 3, and the link line T form a triangle, and the triangle is not deformed.

In reality, the force to rotate the second axis P2 is sometimes generated by rattling or deformation of the sliding member 7; however, even in such a case, since the distance between the screw fastening axis L2 and the second axis P2 is large, the force to rotate the second axis P2 is small, which is well within an acceptable range in the mechanism of the second axis P2.

Further, the reaction force due to the screw tightening is applied to the second axis P2 through the second arm 4 as a shearing force; however, the length of the second arm 4 is sufficiently larger than the diameter of the nut 82 and the like and the force applied is small, which does not deform or excessively wear the second axis P2. The same applies to the first axis P1, and the force applied thereto is small.

Further, the screw tightening produces running torque in the drive shaft 54 and the extension bar 55; however, the running torque is not transmitted to the sliding member 7 that rotatably supports the drive shaft 54 and the extension bar 55. Stated differently, the torque and the reaction force due to the screw tightening are not transmitted to the leading end shaft 43. Since the leading end shaft 43 only needs to drive up and down the sliding member 7, the load is extremely light; thus, a small one can sufficiently withstand the load.

In this regard, in the conventional screw fastening system 9 shown in FIG. 11, the entirety of the screw fastening device 95 is driven to move up and down by the elevation shaft constituting the third shaft 94J; therefore, it was necessary to increase the stiffness of the elevation shaft and use a large motor for elevation driving.

Thus, even in a case where the SCARA robot 10 is small, the SCARA robot 10 can easily receive the reaction force at the time of the screw tightening by the screw fastening device 11, and there is no need to use a large motor or to add a new brake. Further, since the SCARA robot 10 can be small, unlike the case of a large robot, the transfer time is not long and the production efficiency is not decreased. Further, since the weight of the leading end is reduced to reduce the moment of inertia, the positioning speed by the SCARA robot 10 is increased, which shortens the cycle time and enhances the production efficiency.

As described above, according to the embodiment, the screw fastening device 11 can be used easily in combination with a robot such as the SCARA robot 10 without increasing the size of the robot, which enables stable screw tightening with high torque.

In this embodiment, many sets of holes corresponding to SCARA robots of different types and sizes are formed as holes of bolts for attaching the connecting member 61 to the arm casing 40, which enables the screw fastening device 11 to be easily attached to and combined with any one of the SCARA robots 10 of different types and sizes. Note that examples of the arm casing 40 include an exterior panel and a structural member for supporting the same.

In this embodiment, ball bearings are used to rotatably support the drive shaft 54 and the extension bar 55; however, a bearing other than the ball bearing, a sliding bearing, or a fluid bearing may be used.

Figure 10:
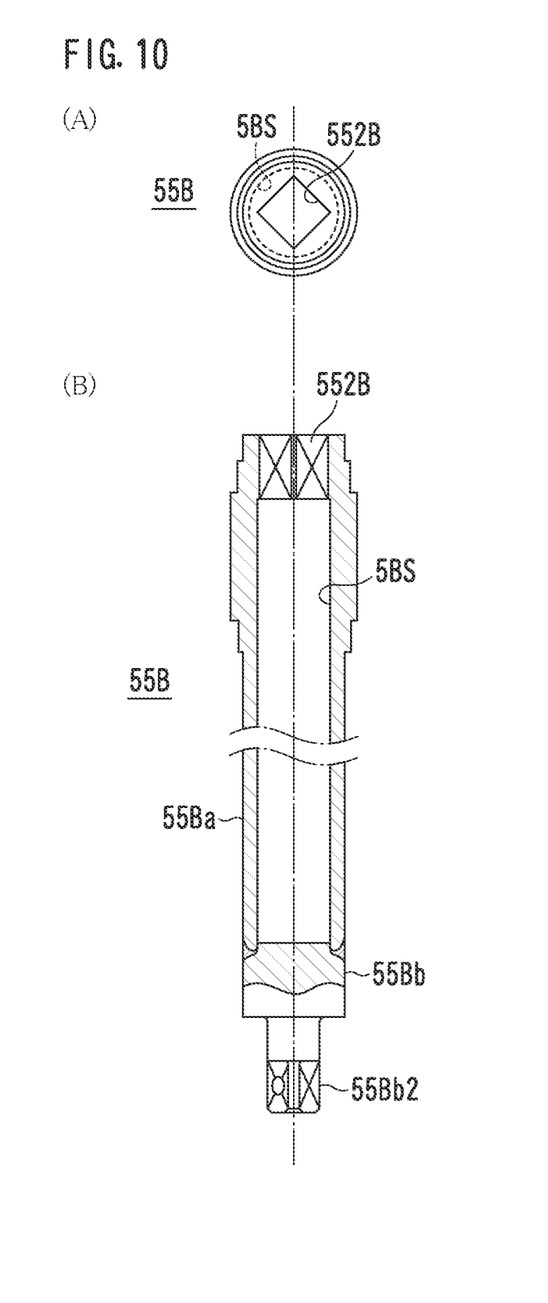
FIG. 10 is a cross-sectional view showing another embodiment of an extension bar.

In the embodiment described above, an extension bar 55B having the configuration shown in FIG. 10 may be used.

Stated differently, FIG. 10 shows the extension bar 55B of another embodiment, FIG. 10(A) is a plan view thereof, and FIG. 10(B) is a front sectional view thereof.

Referring to FIGS. 10(A) and (B), the extension bar 55B includes a cylindrical part 55Ba and a connecting part 55Bb. The cylindrical part 55Ba and the connecting part 55Bb are produced separately and then integrally connected to each other by welding.

The cylindrical part 55Ba has a cylindrical hole 5BS and a hole 552B having an inner surface of a square cross-sectional shape formed on an upper end opening of the hole 5BS.

The connecting part 55Bb has a tip 55Bb2 having the same shape as that of the tip of the output shaft 53. The connecting part 55Bb is welded at a lower end part of the cylindrical part 55Ba so that the shaft cores coincide with each other.

In addition to the embodiments, the entirety of the extension bar may be integrally formed. For example, in a case where the moving distance of the extension bar in the axial direction is small and the hole 5S is shallow, a machining tool for inner diameter machining may be used to machine the hole 5S.

In the embodiment described above, the base 2 is placed on the floor FL; however, the base 2 may be installed on a wall or ceiling of a building.

In the embodiment described above, the SCARA robot 10 including two arms of the first arm 3 and the second arm 4 is used, the second arm 4 is used as a "leading arm" of the present invention and the leading end shaft 43 of the second arm 4 movable along the elevation axis L1 is used as a "leading end shaft" of the present invention. However, the present invention is not limited thereto, and a SCARA robot including three or more arms may be used and a second arm or a third arm thereof may be used as a "leading arm". Further, the present invention is applicable to a multi-joint robot that is not a SCARA robot, or other various robots.

The configuration, the dimensions, the shape, the material, the number, the mounting method, the control contents, and so on of the entire or each part of the base 2, the first arm 3, the second arm 4, the screw fastening device body 5, the attachment unit 6, the sliding member 7, the SCARA robot 10, the screw fastening device 11, and the screw fastening system 1 can be changed appropriately according to the gist of the present invention such as taking into account of the cost and delivery date.

REFERENCE SIGNS LIST 1 screw fastening system
10 SCARA robot (robot)
11 screw fastening device
2 base
3 first arm (arm)
4 second arm (leading arm)
40 arm casing (casing)
41 motor (driving means)
43 leading end shaft
50 drive (screw fastening driving means)
54 drive shaft
55, 55B extension bar
56 tool
6 attachment unit (connecting member)
61 connecting member
7 sliding member
L1 elevation axis (first axis)
L2 screw fastening axis (second axis)

The invention claimed is:

1. A screw fastening system comprising:
a SCARA robot having a first arm at a base and a second arm on a leading end side of the first arm that is connected in series to the first arm wherein the first arm is configured to swing around a first axis that is located on a proximal end side of the first arm, and the second arm is configured to swing around a second axis that is located on the leading end side of the first arm, the first and second axes extending in parallel;
a leading end shaft that is provided in a leading end side of the second arm, is driven to move up and down along an elevation axis that is an output shaft of the second arm by a driving means of the second arm, and extends in parallel to the first and second axes; and
a screw fastening device that is fixed to a casing of the second arm in a screw fastening axis that is different from the elevation axis and parallel to the elevation axis such that the screw fastening device is configured to swing around the second axis together with the leading end shaft when the second arm swings around the second axis; wherein the screw fastening device includes
a screw fastening driving means that is fixed to in the casing of the second arm,
a drive shaft that extends from the screw fastening driving means in the screw fastening axis and is rotationally driven around the screw fastening axis by the screw fastening driving means,
an extension bar that is connected to the drive shaft to rotate together in the circumferential direction of the screw fastening axis, is configured to move up and down along an axial direction of the screw fastening axis while keeping connected to the drive shaft, and is provided with a tool at a tip of the extension bar, and
a sliding member that is fixed to the leading end shaft to move up and down in response to an up-down movement of the leading end shaft, and supports the extension bar in a manner of allowing the extension bar rotatable relatively in the circumferential direction of the screw fastening axis wherein the extension bar moves up and down following the sliding member,
the up-down movement of the leading end shaft causes movement drive of the extension bar in the screw fastening axis through the sliding member, and a screw of a workpiece fitted to the tool is rotated by rotation drive of the extension bar, which is derived from the screw fastening driving means through the drive shaft.

2. The screw fastening system according to claim 1, further comprising:
a connecting member that is configured to fix the screw fastening driving means to the casing of the second arm,
a bearing box that has an empty space thereinside surrounded by an inner surface, wherein the drive shaft is connected to the screw fastening driving means to be driven inside the bearing box, wherein
the bearing box has one or more of holes with which to bolt the bearing box to the connecting member,
the connecting member has an outer surface with a recess portion,
the bearing box has an outer surface with a protrusion portion of which a shape corresponds to the recess portion of the connecting member, and
when the bearing box is bolted, the protrusion portion is placed into the recess portion to mate.

3. The screw fastening system according to claim 2, wherein
the bearing box has ball bearings arranged in a ring shape in the empty space, and
the ball bearings are sandwiched between the inner surface of the bearing box and an outer surface of the drive shaft such that the drive shaft is firmly supported in a lateral direction that is perpendicular to the axial direction of the screw fastening axis while being rotated around the screw fastening axis.

4. The screw fastening system according to claim 3, wherein
the bearing box has other ball bearings arranged in a ring shape in the empty space, and
the other ball bearings are sandwiched between the inner surface of the bearing box and an outer surface of the screw fastening drive means such that the screw fastening drive means is firmly supported in the lateral direction while rotating around the screw fastening axis.

5. The screw fastening system according to claim 2, wherein
the screw fastening device is positioned outside the casing of the second arm, a first distance that is determined between the first axis and the second axis is larger than a tip distance that is determined between the elevation axis and the screw fastening axis, and a second distance that is determined between the second axis and the elevation axis is larger than the tip distance.

6. The screw fastening system according to claim 5, wherein
the screw fastening device is positioned farthest from the first axis where the first arm, the second arm, and the screw fastening device are aligned straight.

7. A screw fastening device fixed to a casing of a second arm of a SCARA robot, the SCARA robot having a first arm at a base and the second arm on a leading end side that is connected in series to the first arm wherein the first arm is configured to swing around a first axis that is located on a proximal end side of the first arm, and the second arm is configured to swing around a second axis that is located on the leading end side of the first arm, the first and second axes extending in parallel, and has a leading end shaft that is provided in a leading end side of the second arm, and the leading end shaft being driven to move up and down along an elevation axis that is an output shaft of the second arm by a driving means of the second arm, and extends in parallel to the first and second axes, the screw fastening device comprising:
a screw fastening driving means fixed to in the casing of the second arm;
a connecting member that fixes the screw fastening driving means to a leading arm so that a screw fastening axis parallel to the elevation axis serves as a rotation axis of the screw fastening driving means;
a drive shaft that extends from the screw fastening driving means in the screw fastening axis and is rotationally driven around the screw fastening axis by the screw fastening driving means;
an extension bar that is connected to the drive shaft to rotate together in a circumferential direction of the screw fastening axis, is configured to move up and down along an axial direction of the screw fastening axis while keeping connected to the drive shaft, and is provided with a tool at a tip of the extension bar; and
a sliding member that is fixedly connected to the leading end shaft to move up and down in response to an up-down movement of the leading end shaft and supports the extension bar in a manner of allowing the extension bar rotatable relatively in the circumferential direction of the screw fastening axis wherein the extension bar moves up and down following the sliding member; wherein
the up-down movement of the leading end shaft causes movement drive of the extension bar in the screw fastening axis through the sliding member, and a screw of a workpiece fitted to the tool is rotated by rotation drive of the extension bar, which is derived from the screw fastening driving means through the drive shaft.

8. The screw fastening device according to claim 7, wherein the connecting member has a plurality of sets of holes with which to bolt the connecting member to the casing at different positions.

9. The screw fastening device according to claim 7, further comprising:
a bearing box that has an empty space thereinside surrounded by an inner surface, wherein the drive shaft is connected to the screw fastening drive means to be driven inside the bearing box, wherein
the bearing box has one or more of holes with which to bolt the bearing box to the connecting member,
the connecting member has an outer surface with a recess portion,
the bearing box has an outer surface with a protrusion portion of which a shape corresponds to the recess portion of the connecting member, and
when the bearing box is bolted, the protrusion portion is placed into the recess portion to mate.

10. The screw fastening device according to claim 9, wherein
the bearing box has ball bearings arranged in a ring shape in the empty space, and
the ball bearings are sandwiched between the inner surface of the bearing box and an outer surface of the drive shaft such that the drive shaft is firmly supported in a lateral direction that is perpendicular to the axial direction of the screw fastening axis while being rotated around the screw fastening axis.

11. The screw fastening device according to claim 10, wherein
the bearing box has other ball bearings arranged in a ring shape in the empty space, and
the other ball bearings are sandwiched between the inner surface of the bearing box and an outer surface of the screw fastening drive means such that the screw fastening drive means is firmly supported in the lateral direction while rotating around the screw fastening axis.

12. The screw fastening device according to claim 9, wherein
the screw fastening device is positioned outside the casing of the second arm,
a first distance that is determined between the first axis and the second axis is larger than a tip distance that is determine between the elevation axis and the screw fastening axis, and
a second distance that is determined between the second axis and the elevation axis is larger than the tip distance that is determine between the elevation axis and the screw fastening axis.

13. The screw fastening device according to claim 12, wherein
the screw fastening device is positioned farthest from the first axis where the first arm, the second arm, and the screw fastening device are aligned straight.

* * * * *